(12) United States Patent
Watanabe

(10) Patent No.: US 7,778,481 B2
(45) Date of Patent: Aug. 17, 2010

(54) APPARATUS AND METHOD FOR IMAGE PROCESSING INCLUDING PHOTOMETRY AND COLORIMETRY

(75) Inventor: Katsuaki Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1026 days.

(21) Appl. No.: 11/339,666

(22) Filed: Jan. 26, 2006

(65) Prior Publication Data

US 2006/0171605 A1     Aug. 3, 2006

(30) Foreign Application Priority Data

Jan. 28, 2005    (JP)   ............................ 2005-022054

(51) Int. Cl.
    *G06K 9/00*       (2006.01)
    *G06K 9/40*       (2006.01)

(52) U.S. Cl. ....................................... 382/274; 382/167

(58) Field of Classification Search ................. 382/162, 382/274; 348/222.1
See application file for complete search history.

(56) References Cited

U.S. PATENT DOCUMENTS

| | | | | | |
|---|---|---|---|---|---|
| 5,353,058 | A | * | 10/1994 | Takei | 348/363 |
| 5,404,196 | A | * | 4/1995 | Terashita et al. | 355/77 |
| 5,418,546 | A | * | 5/1995 | Nakagakiuchi et al. | 345/85 |
| 5,629,752 | A | * | 5/1997 | Kinjo | 355/35 |
| 5,892,987 | A | * | 4/1999 | Ohmori | 396/61 |
| 5,940,530 | A | * | 8/1999 | Fukushima et al. | 382/164 |
| 6,349,175 | B1 | * | 2/2002 | Tokunaga | 396/157 |
| 6,445,819 | B1 | * | 9/2002 | Kinjo | 382/173 |
| 6,670,992 | B2 | * | 12/2003 | Irie | 348/350 |
| 6,940,545 | B1 | * | 9/2005 | Ray et al. | 348/222.1 |
| 6,950,141 | B2 | * | 9/2005 | Mori et al. | 348/362 |
| 7,010,160 | B1 | * | 3/2006 | Yoshida | 382/162 |
| 7,415,166 | B2 | * | 8/2008 | Kubota | 382/284 |
| 7,564,486 | B2 | * | 7/2009 | Ikeda | 348/222.1 |
| 2003/0071908 | A1 | | 4/2003 | Sannoh et al. | |
| 2005/0012832 | A1 | * | 1/2005 | Yano | 348/234 |

FOREIGN PATENT DOCUMENTS

| | | |
|---|---|---|
| JP | 4-167771 A | 6/1992 |
| JP | 7-288826 A | 10/1995 |
| JP | 2001-197358 A | 7/2001 |
| JP | 2002-32743 A | 1/2002 |

(Continued)

*Primary Examiner*—Samir A. Ahmed
*Assistant Examiner*—Li Liu
(74) *Attorney, Agent, or Firm*—Birch, Stewart, Kolasch & Birch, LLP

(57) ABSTRACT

The present invention provides an image processing apparatus comprising: a principal object extraction device which extracts a shape of a principal object from an overall screen of an image entered, a weighted area determining device which determines a plurality of areas including the area of the principal object that matches the shape of the extracted principal object as a weighted area, a weighting factor determining device which determines a weighting factor for each of the determined weighted areas, a measuring device which divides the overall screen into a plurality of areas and calculates measured values of divided photometry and/or divided colorimetry for each divided area, and a correction device which performs exposure correction and/or white balance correction based on a measured value calculated for each divided area and a weighting factor determined for each of the weighted areas to which the divided area of each measured value belongs.

11 Claims, 10 Drawing Sheets

FOREIGN PATENT DOCUMENTS

| | | |
|---|---|---|
| JP | 2002-320137 A | 10/2002 |
| JP | 2003-107567 A | 4/2003 |
| JP | 2004-185555 | 2/2004 |
| JP | 2004-085914 * | 3/2004 |
| JP | 2004-85914 A | 3/2004 |
| WO | WO-2004/002166 A1 | 12/2003 |

* cited by examiner

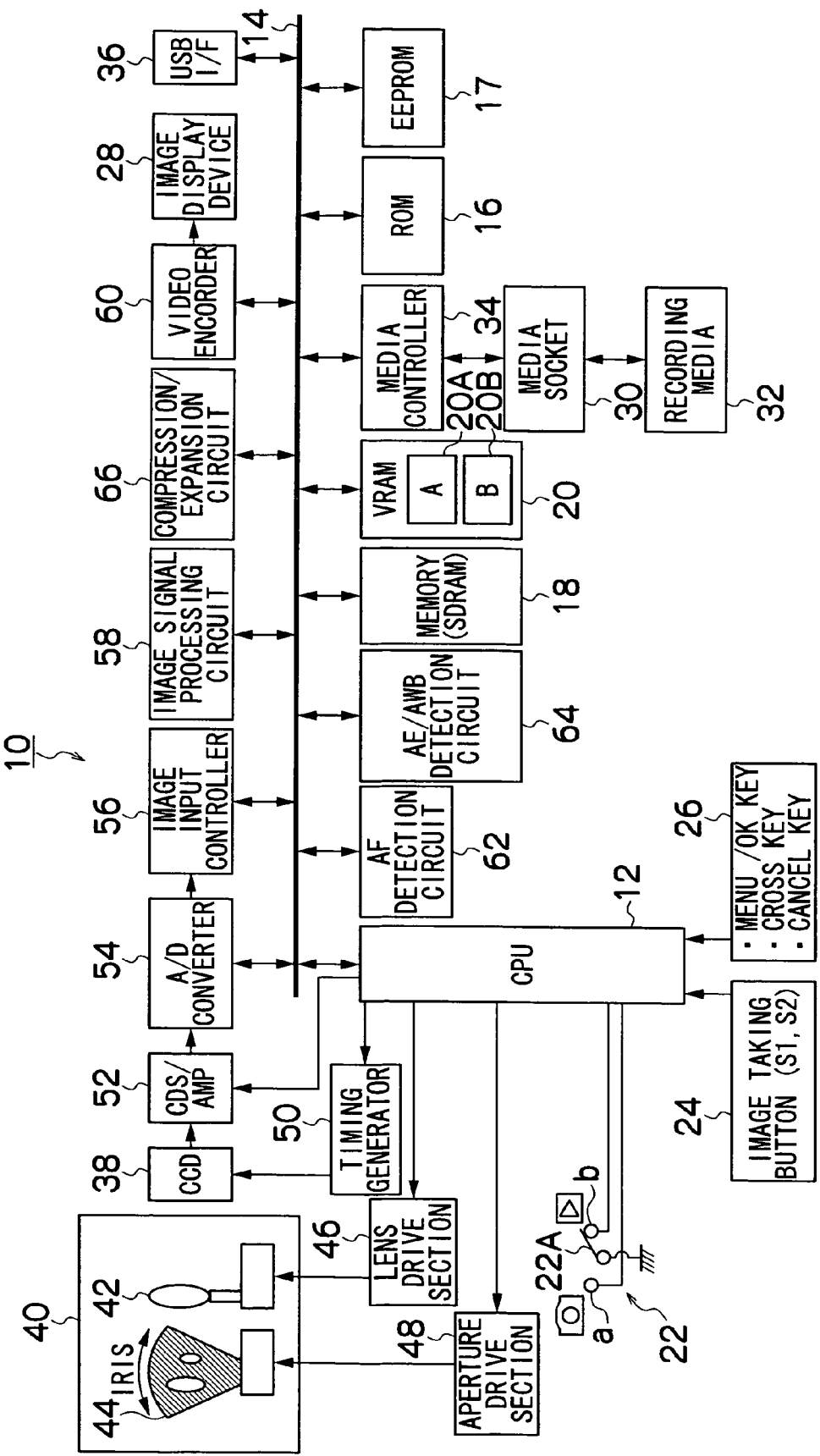

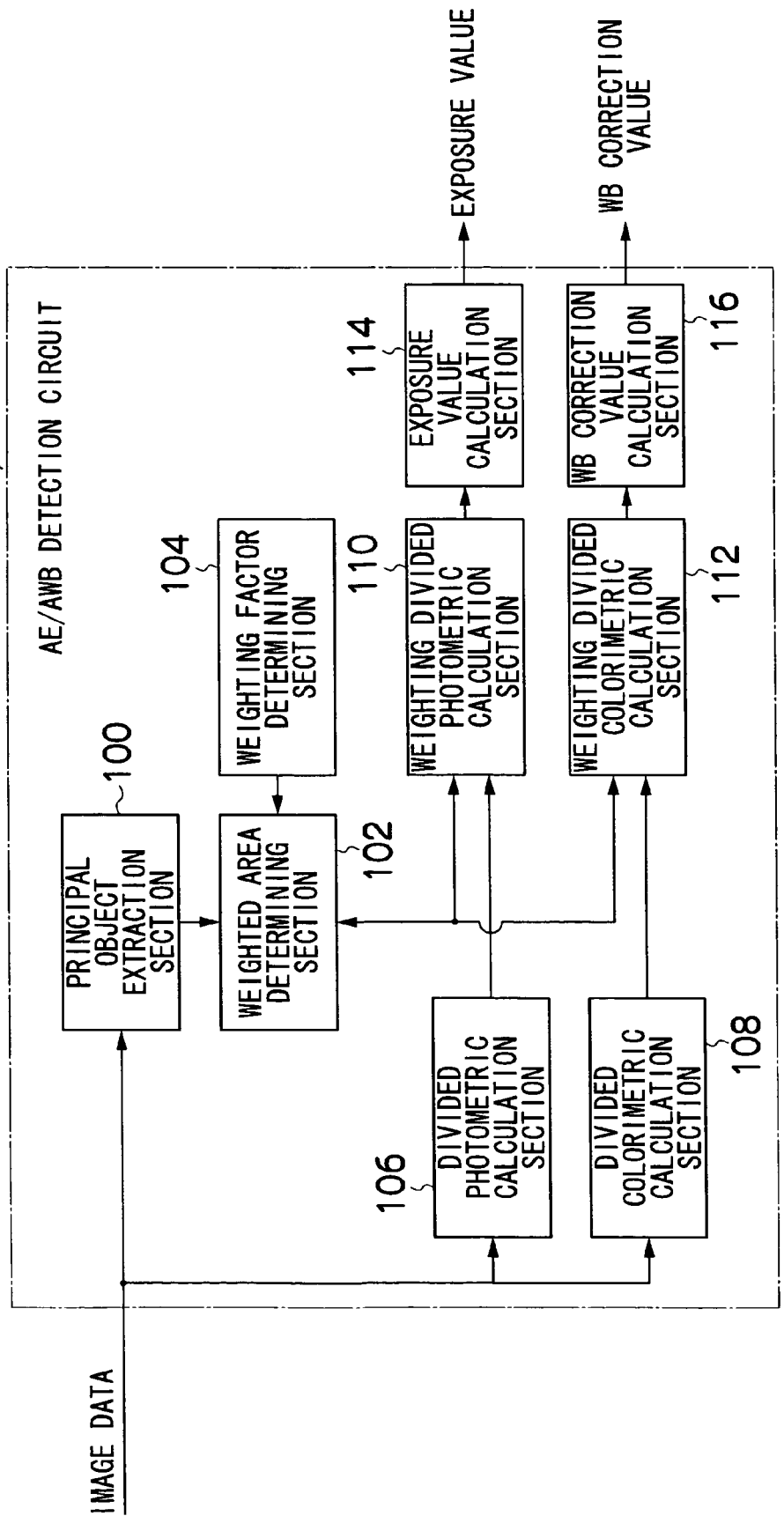

APPARATUS AND METHOD FOR IMAGE PROCESSING INCLUDING PHOTOMETRY AND COLORIMETRY

BACKGROUND OF THE INVENTION

1. Field of the Invention

The present invention relates to an apparatus and method for image processing, and more particularly, to an apparatus and method for image processing which carries out exposure correction and white balance correction.

2. Description of the Related Art

Conventionally, there is a proposal of an imaging device which detects a person's face from image data entered and controls stroboscopic light emissions based on the result detection of the face (Japanese Patent Application Laid-Open No. 2003-107567). This imaging device automatically decides whether an image of a person is taken or not by detecting the person's face and automatically allows stroboscopic light emission control (light emission control in red-eye prevention light emission mode) suitable for image taking of people.

Furthermore, the imaging device described in Japanese Patent Application Laid-Open No. 2003-107567 calculates the brightness of the part of the face detected through face detection processing and the brightness of surroundings, compares the brightness of the two, decides whether an object is against the sun or not, and when it decides that the object is against the sun, it emits stroboscopic light so that the person's face does not become dark. Thus, even when the person is not in the center of the screen, the device allows an image to be automatically taken with stroboscopic light for backlight correction.

SUMMARY OF THE INVENTION

However, according to Japanese Patent Application Laid-Open No. 2003-107567, detection of the person's face and measurement of the brightness of the part of the person's face are conducted to decide whether an image of a person is taken or not or decide whether the person is against the sun or not, and Japanese Patent Application Laid-Open No. 2003-107567 includes no description that the photometric result of the part of the person's face is applied to exposure control of anything other than stroboscopic light emission.

Furthermore, Japanese Patent Application Laid-Open No. 2003-107567 also includes descriptions of centerweighted metering photometric system, partial photometric system, spot photometric system and split photometric system as the photometric system, but includes no descriptions of any photometric system using the brightness of the part of a person's face.

That is, the imaging device described in Japanese Patent Application Laid-Open No. 2003-107567 cannot perform exposure control by taking into consideration at which position on the screen and in what size a principal object such as person appears and cannot perform exposure control so as to optimize exposure of the principal object.

Furthermore, Japanese Patent Application Laid-Open No. 2003-107567 gives neither description of white balance correction nor description of a calorimetric result applied to white balance correction.

The present invention has been implemented in view of the above described circumstances and it is an object of the present invention to provide an apparatus and method for image processing capable of realizing photometry or colorimetry adopting weighting suitable for the shape and position of a principal object such as a person which cannot be covered by a conventional photometric system such as a centerweighted metering photometric system and performing more appropriate exposure correction and white balance correction.

SUMMARY OF THE INVENTION

In order to attain the above described object, an image processing apparatus according to a first aspect of the present invention comprises a principal object extraction device which extracts a shape of a principal object from an overall screen of an image entered, a weighted area determining device which determines a plurality of areas including the area of the principal object that matches the shape of the extracted principal object as a weighted area, a weighting factor determining device which determines a weighting factor for each of the determined weighted areas, a measuring device which divides the overall screen into a plurality of areas and calculates measured values of divided photometry and/or divided colorimetry for each divided area and a correction device which performs exposure correction and/or white balance correction based on a measured value calculated for each divided area and a weighting factor determined for each of the weighted areas to which the divided area of each measured value belongs.

That is, the shape of a principal object such as a person is extracted, an area of the principal object that matches the shape of the principal object is used as the area for photometry/colorimetry, and a plurality of areas including the area of the principal object are determined as weighted areas. On the other hand, the overall screen is divided into a plurality of areas and measured values of divided photometry and/or divided colorimetry are calculated for each divided area, and a weighting factor is determined for the measured value calculated for each divided area. Here, a factor determined for each weighted area to which the divided area of each measured value belongs is used as the weighting factor corresponding to each divided area. Exposure correction and/or white balance correction are performed based on a measured value calculated for each divided area and a weighting factor determined for each of the weighted areas to which the divided area of each measured value belongs. That is, information on the shape and position of the principal object is reflected in the weighting factor of each divided area, allowing exposure correction and/or white balance correction more suitable for the principal object.

A second aspect of the present invention is the image processing apparatus according to the first aspect, wherein the principal object extraction device extracts a person's face.

A third aspect of the present invention is the image processing apparatus according to the second aspect, wherein shapes of a plurality of areas obtained by dividing the overall screen are hexagons having the same area. That is, by adopting hexagon divided areas, the divided areas are more suitable for the shape of the face than square divided areas.

A fourth aspect of the present invention is the image processing apparatus according to the first aspect, wherein the weighted area determining device divides a weighted area into an area of the principal object and an area other than the area of the principal object.

A fifth aspect of the present invention is the image processing apparatus according to the fourth aspect, wherein the principal object extraction device extracts a person's face, the weighted area determining device divides the area of the principal object into weighted areas of a flesh color area of the extracted person's face, hair area and areas peripheral to the flesh color area or the hair area. The flesh color area is given a larger weighting factor than those for the hair area and peripheral areas.

A sixth aspect of the present invention is the image processing apparatus according to the fourth or fifth aspect, wherein the weighted area determining device divides the area other than the area of the principal object into a plurality of weighted areas according to a distance from a center of the principal object. As the distance of an area from the center of the principal object decreases, its weighting factor is increased.

A seventh aspect of the present invention is the image processing apparatus according to the first aspect, further comprising: a light source direction detection device which detects a direction of incidence of a light source with respect to the principal object, wherein the weighting factor determining device changes the weighting factor for the area of the principal object according to the detected direction of incidence of the light source with respect to the principal object.

An eighth aspect of the present invention is the image processing apparatus according to the seventh aspect, wherein the light source direction detection device detects states of backlight, front light and oblique light. For example, when the direction of light from a light source incident upon the principal object is backlight direction, the weighting factor is changed to a larger factor than that for front light so that the principal object does not become darker.

A ninth aspect of the present invention is the image processing apparatus according to the first aspect, wherein the weighting factor determining device further differentiates a weighting factor to be determined for each of the determined weighted areas between divided photometry and divided colorimetry.

An image processing method according to a tenth aspect of the present invention comprises a step of extracting a shape of a principal object from an overall screen of an image entered, a step of determining a plurality of areas including the area of the principal object that matches the shape of the extracted principal object as weighted areas, a step of determining a weighting factor for each of the determined weighted areas, a step of dividing the overall screen into a plurality of areas and calculating a measured value of divided photometry and/or divided colorimetry for each divided area and a step of carrying out exposure correction and/or white balance correction based on a measured value calculated for each divided area and a weighting factor determined for each of the weighted areas to which the divided area of each measured value belongs.

According to the present invention, it is possible to realize photometry or colorimetry applying weighting suitable for the shape and position of a principal object such as a person, and as a result of this, it is possible to carry out more appropriate exposure correction or white balance correction.

BRIEF DESCRIPTION OF THE DRAWINGS

FIG. 1 is a block diagram showing an embodiment of a camera to which an image processing apparatus of the present invention is applied;

FIG. 2 is a block diagram showing a first embodiment of the AE/AWB detection circuit shown in FIG. 1;

DETAILED DESCRIPTION OF THE PREFERRED EMBODIMENTS

Figure 3A:
FIG. 3A shows an example of an original image including a person.

With reference now to the attached drawings, preferred embodiments of the apparatus and method for image processing according to the present invention will be explained below.

FIG. 1 is a block diagram showing an embodiment of a camera to which an image processing apparatus of the present invention is applied.

This camera 10 is a digital camera provided with recording and reproducing functions of still images and moving images, and the overall operation of the camera 10 are controlled in a centralized manner by a central processing unit (CPU) 12. The CPU 12 functions as a control device which controls this camera system according to a predetermined program.

A ROM 16 connected to the CPU 12 via a bus 14 stores various types of data or the like necessary for a program and control executed by the CPU 12, and an EEPROM 17 stores various constants/information or the like related to CCD pixel defect information and camera operations.

Furthermore, a memory (SDRAM) 18 is used as a development area of a program and a calculation work area of the CPU 12 and also used as a temporary storage area of image data and voice data. A VRAM 20 is a temporary storage memory dedicated to image data and includes area A 20A and area B 20B. The memory 18 and VRAM 20 can be shared.

The camera 10 is provided with a mode selection switch 22, an image taking button 24 and an operation device 26 including a menu/OK key, a cross key, a cancel key or the like. Signals from these various operation sections (22 to 26) are input to the CPU 12, and the CPU 12 controls various circuits of the camera 10 based on input signals and performs, for example, lens drive control, image taking operation control, image processing control, recording/reproduction control of image data, display control of an image display device 28 or the like.

The mode selection switch 22 is an operation device which switches between an image taking mode and reproducing mode. When a movable contact piece 22A is connected to a contact a by operating the mode selection switch 20, the signal is input to the CPU 12, the camera 10 is set to an image taking mode and when the movable contact piece 22A is connected to a contact b, the camera 10 is set to a reproducing mode in which a recorded image is reproduced.

The image taking button 24 is an operation button to input a command for starting image taking and constructed of a two-stage stroke type switch having an S1 switch which is turned ON when half depressed and an S2 switch which is turned ON when fully depressed.

The menu/OK key is an operation key which has a double function as a menu button to display a menu on a screen of the image display device 28 and as an OK button to command a confirmation and execution or the like of a selected content. The cross key is an operation section which inputs commands in four directions up, down, left and right and functions as a button (cursor movement operation device) to select an item from the menu screen or instruct selections of various setting items from each menu. Furthermore, the up/down keys of the cross key have a function as a zoom switch or reproduction zoom switch during reproduction and the left/right keys have a function as buttons to feed frames (forward/backward feeding) in a reproducing mode. The cancel key is used to erase a desired target such as a selected item, erase an instruction content or return to an operation state one step before or the like.

The image display device 28 is constructed of a liquid crystal display capable of color display. The image display device 28 can be used as an electronic finder for confirming an angle of view when an image is taken and is used as a device to reproduce and display a recorded image. Furthermore, the image display device 28 is also used as a display screen for a user interface, and menu information or information such as a selected item, setting content is displayed as required. Instead of the liquid crystal display, a display device of a different system such as organic EL can also be used.

The camera 10 has a media socket (media loading section) 30 and the media socket 30 can be loaded with a recording medium 32. The mode of the recording medium is not particularly limited and various types of medium such as a semiconductor memory card represented by xD-PictureCard (trade mark) and smart media (trade mark), potable small hard disk, magnetic disk, optical disk and magneto-optical disk can be used.

A media controller 34 performs a required signal conversion for exchanging an input/output signal appropriate for the recording medium 32 loaded in the media socket 30.

Furthermore, the camera 10 is provided with a USB interface section 36 as a communication device for connections to other external devices such as a personal computer. By connecting the camera 10 to an external device using a USB cable (not shown), it is possible to exchange data with the external device. It goes without saying that the communication system is not limited to USB, and IEEE 1394, Bluetooth and other communication system can also be used.

Next, the image-taking function of the camera 10 will be explained.

When an image taking mode is selected by the mode selection switch 22, power is supplied to an image pickup section including a color CCD solid image pickup element (hereinafter referred to as "CCD") 38 and the camera is ready for image taking.

A lens unit 40 is an optical unit including an image taking lens 42 including a focus lens and a dual-purpose aperture/mechanical shutter 44. The lens unit 40 is electrically driven by a lens drive section 46 and an aperture drive section 48 under the control of the CPU 12, and subjected to zoom control, focus control and iris control.

Light which has passed through the lens unit 40 forms an image on a light-receiving surface of a CCD 38. Many photodiodes (light-receiving elements) are two-dimensionally arrayed on the light-receiving surface of the CCD 38 and basic color filters of red (R), green (G), blue (B) corresponding to the respective photodiodes are arranged in a predetermined array structure (Bayer, G-stripe or the like). Furthermore, the CCD 38 also has an electronic shutter which controls a charge storage time (shutter speed) of each photodiode. The CPU 12 controls the charge storage time by the CCD 38 via a timing generator 50. Note that an image pickup element based on a different system such as MOS (metal-oxide semiconductor) type can also be used instead of the CCD 38.

An object image formed on the light-receiving surface of the CCD 38 is converted to the amount of signal charge corresponding to the amount of incident light by each photodiode. Signal charges stored in the respective photodiodes are sequentially read based on drive pulses given from a timing generator 50 in accordance with commands from the CPU 12 as voltage signals (image signals) according to the signal charges.

A signal output from the CCD 38 is sent to an analog processing section (CDS/AMP) 52, where R, G, B signals for each pixel are sampled and held (correlative double sampling processing), amplified and then added to an A/D converter 54. Dot sequential R, G, B signals converted to digital signals by the A/D converter 54 are stored in the memory 18 via an image input controller 56.

An image signal processing circuit 58 processes the R, G, B signals stored in the memory 18 according to commands from the CPU 12. That is, the image signal processing circuit 58 functions as an image processing device including a synchronization circuit (processing circuit which interpolates spatial shifts of color signals caused by a color filter array of a single-board CCD and synchronously converts the color signals), a white balance correction circuit, a gamma correction circuit, a contour correction circuit and a brightness/color difference signal generation circuit or the like and carries out predetermined signal processing using the memory 18 according to commands from the CPU 12.

The RGB image data input to the image signal processing circuit 58 is converted to a brightness signal (Y signal) and color difference signal (Cr, Cb signal) by the image signal processing circuit 58 and subjected to predetermined processing such as gamma correction. The image data processed by the image signal processing circuit 58 is stored in the VRAM 20.

When a captured image is output on the monitor of the image display device 28, the image data is read from the VRAM 20 and sent to a video encoder 60 via the bus 14. The video encoder 60 converts the image data entered to a signal based on a predetermined display system (e.g., NTSC system color composite video signal) and outputs it to the image display device 28.

Image data expressing a 1-frame image is rewritten into the area A 20A and area B 22B alternately by image signals output from the CCD 38. Of the area A 22A and area B 22B of the VRAM 22, the written image data is read from the area other than the area in which the image data is being rewritten. In this way, the image data in the VRAM 20 is periodically rewritten, a video signal generated from the image data is supplied to the image display device 28 and a video being captured is thereby displayed on the image display device 28 in real time. The user can confirm an angle of view of image taking through a video (through movie image) displayed on the image display device 28.

When the image taking button 24 is half depressed and S1 is turned ON, the camera 10 starts AE and AF processing. That is, an image signal output from the CCD 38 is A/D-converted and then input to an AF detection circuit 62 and AE/AWB detection circuit 64 via the image input controller 56.

The AE/AWB detection circuit 64 includes a circuit which divides 1 screen into a plurality of areas and integrates RGB signals for each divided area, detects the brightness (object brightness) of the object based on the integrated value and calculates an exposure value (image taking EV value) suitable for image taking. This exposure value is output to the CPU 12. The CPU 12 determines an aperture and shutter speed according to the exposure value entered and a predetermined program diagram, controls the electronic shutter and iris of the CCD 38 according thereto and obtains an appropriate exposure.

Furthermore, the AE/AWB detection circuit 64 calculates an average integrated value for each color of RGB signal of each divided area, obtains an integrated value of R, an integrated value of B and an integrated value of G and calculates a ratio between R/G and B/G for each divided area. The AE/AWB detection circuit 64 decides the type of light source based on the distribution in the color space of R/G, B/G of these R/G, B/G values and calculates a gain value (white balance correction value) with respect to the R, G, B signals of the white balance adjustment circuit such that the value of each ratio becomes approximately 1 (that is, the integration ratio of RGB on 1 screen becomes R:G:B≅1:1:1) in accordance with the white balance adjustment value suitable for the decided type of light source. This white balance correction value (WB correction value) is output to the white balance correction circuit in the image signal processing circuit 58, where gain correction (white balance correction) on the R, G, B signals is performed. When the gain value of the white balance adjustment circuit is adjusted so that the aforementioned value of each ratio becomes any value other than 1, it is possible to generate an image with a certain color tone remaining.

The AE/AWB detection circuit 64 according to the present invention will be explained more specifically later.

For the AF control in the camera 10, contrast AF is applied in which a focusing lens (moving lens which contributes to focus adjustment out of the lens optical system making up the image taking lens 42) is moved so that, for example, a high frequency component of the G signal of a video signal becomes a maximum. That is, the AF detection circuit 62 is constructed of a high pass filter which allows only the high frequency component of the G signal to pass, an absolute value processing section, an AF area extraction section which extracts a signal in the area to be focused preset within the screen (e.g., central part of the screen) and an integration section which integrates absolute value data in the AF area.

The data of the integrated value obtained by the AF detection circuit 62 is notified to the CPU 12. The CPU 12 calculates focus evaluation values (AF evaluation values) at a plurality of AF detection points while controlling the lens drive section 46 to move the focusing lens and determines the lens position where the evaluation value becomes a maximum as an in-focus position. Then, the CPU 12 controls the lens drive section 46 so that the focusing lens is moved to the calculated in-focus position. The calculation of the AF evaluation value is not limited to the mode in which the G signal is used and the brightness signal (Y signal) can also be used.

When the image taking button 24 is half depressed and S1 is turned ON, AE/AF processing is carried out and when the image taking button 24 is fully depressed and S2 is turned ON, the image taking operation for recording is started. The image data acquired in response to S2 ON is converted to brightness/color difference signal (Y/C signal) by the image signal processing circuit 58, subjected to predetermined processing such as gamma correction, and then stored in the memory 18.

The Y/C signal stored in the memory 18 is compressed according to a predetermined format by a compression/expansion circuit 66, and then recorded in the recording medium 32 via the media controller 34. For example, a still image is recorded in a JPEG (Joint Photographic Experts Group) format.

When the reproducing mode is selected by the mode selection switch 22, the compressed data of the final image file (last recorded file) recorded in the recording medium 32 is read. When the file related to the last recording is a still image file, the read image compressed data is expanded to a non-compressed YC signal via the compression/expansion circuit 66, converted to a display signal via the image signal processing circuit 58 and video encoder 60, and then output to the image display device 28. This allows the image content of the file to be displayed on the screen of the image display device 28.

By operating the right key or left key of the cross key while one frame of the still image is being reproduced (also while the start frame of the moving image is being reproduced), it is possible to switch between files that can be reproduced (forward frame feeding/backward frame feeding). The image file at the position at which the frame is fed is read from the recording medium 32, and the still image and moving image are reproduced and displayed on the image display device 28 as described above.

Next, details of the AE/AWB detection circuit 64 of the present invention will be explained.

FIG. 2 is a block diagram showing a first embodiment of the AE/AWB detection circuit 64 shown in FIG. 1.

The AE/AWB detection circuit 64 is constructed of a principal object extraction section 100, a weighted area determining section 102, a weighting factor determining section 104, a divided photometric calculation section 106, a divided colorimetric calculation section 108, a weighting divided photometric calculation section 110, a weighting divided colorimetric calculation section 112, an exposure value calculation section 114 and a white balance correction value calculation section 116.

The principal object extraction section 100 is intended to extract a principal object such as a person's face, flower, building and input 1-screen image data (R, G, B signals) temporarily saved in the memory 18, analyze this image data and extract the shape of the principal object.

Figure 3B:
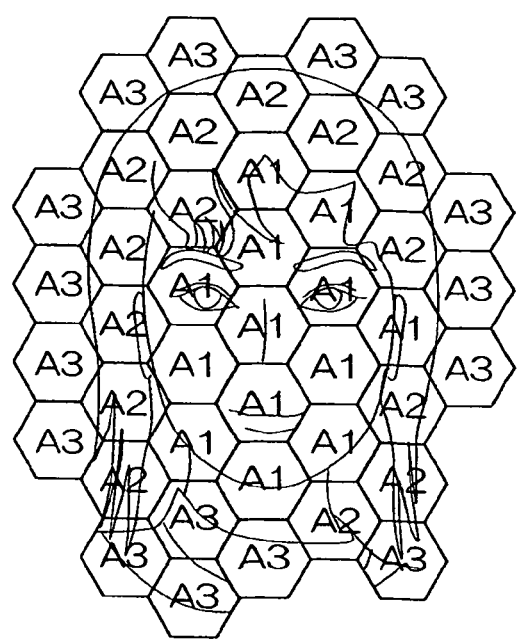
FIG. 3B shows a result of extraction of the shape of a principal object (face) from the original image.

FIG. 3A is an example of an original image including the person to be input to the AE/AWB detection circuit 64 and FIG. 3B shows a case where the shape of the principal object (face) is extracted from the original image.

For example, when the shape of the person's face is extracted, the flesh color in the original image is extracted first and the area is sequentially expanded from a certain point of the area of the flesh color to a linked area which seems to belong to the same area, then the face area is extracted according to whether the shape of the area extracted in this way is the shape of the face (shape similar to a circle or ellipse) or not, the image data in this face area is analyzed and the face is detected according to whether face parts such as eyes, nose, mouth exist or not. Then, the flesh color area, hair area, areas peripheral to the flesh color area and hair area or the like of the detected face are extracted. The method of extracting the shape of the face is not limited to this embodiment and various extraction methods can be applied.

Now, the image itself is defined as I(x,y) and the inside and outside of the principal object (face) are defined by the following flags:

I(x,y): inside of face→flag=1

I(x,y): outside of face→flag=0

The weighted area determining section 102 divides a 1-screen image into the internal area of the principal object and the external area of the principal object and further divides the inside of the principal object into the flesh color area, hair area and areas peripheral to the flesh color area or hair area (see FIG. 3B), while the weighted area determining section 102 divides the external area of the principal object into a plurality of areas (small distance, medium distance and large distance) according to the distance from the center of the principal object and determines the plurality of areas divided in this way as weighted areas. Since this embodiment assumes the person's face as the principal object, the inside of the principal object is divided into the flesh color area, hair area and their peripheral areas, but the present invention is not limited to this and it is also possible to divide the inside of the principal object into a plurality of areas according to the distance from the center of the principal object.

The weighting factor determining section 104 gives a weighting factor to each weighted area determined by the weighted area determining section 102. It is supposed that a weighting factor is set in each area in advance.

That is, when flag=1, for the internal area of the face determined by the weighted area determining section 102, the following weighting factors are determined:

$I(x,y):V_{th1} \rightarrow L_{in}$-weight=$A1$, $C_{in}$-weight=$A1$ (1)

$I(x,y):V_{th2} \rightarrow L_{in}$-weight=$A2$, $C_{in}$-weight=$A2$ (2)

$I(x,y):V_{th3} \rightarrow L_{in}$-weight=$A3$, $C_{in}$-weight=$A3$ (3)

where, $V_{th1}$: flesh color area of face, $V_{th2}$: hair area, $V_{th3}$: peripheral area A1, A2, A3: weighting factor, magnitude relationship is A1>A2>A3.

$L_{in}$-weight: divided photometric weighting factor $C_{in}$-weight: divided calorimetric weighting factor When flag=0, the following weighting factors are determined depending on the distances d1, d2, d3 from the center of the principal object according to the normal centerweighted metering divided photometric/divided colorimetric system.

A. Centerweighted Metering Divided Photometric/Divided Colorimetric System $I(x,y):d1 \rightarrow L_{out}$-weight=$B1$, $C_{in}$-weight=$B1$ (1)

$I(x,y):d2 \rightarrow L_{out}$-weight=$B2$, $C_{in}$-weight=$B2$ (2)

$I(x,y):d3 \rightarrow L_{out}$-weight=$B3$, $C_{in}$-weight=$B3$ (3)

where, d1: small distance, d2: medium distance, d3: large distance.

B1, B2, B3: weighting factor, magnitude relationship is B1>B2>B3.

B. Average Divided Photometric/Divided Colorimetric System $I(x,y):d1 \rightarrow L_{out}$-weight=$C1$, $C_{in}$-weight=$C1$ (1)

$I(x,y):d2 \rightarrow L_{out}$-weight=$C1$, $C_{in}$-weight=$C1$ (2)

$I(x,y):d3 \rightarrow L_{out}$-weight=$C1$, $C_{in}$-weight=$C1$ (3)

Instead of the centerweighted metering divided photometric/divided colorimetric system or average divided photometric/divided colorimetric system, it is also possible to apply other divided photometric/divided colorimetric systems.

The divided photometric calculation section 106 divides 1 screen into a plurality of areas (e.g., 256=16×16) and calculates a photometric value for each divided area. Here, the shape of each divided area is a hexagon as shown in FIG. 3B, which is the shape of the divided area more suitable for the shape of the face than the conventional square divided area. The divided photometric calculation section 106 calculates a photometric value (Evi value) for each divided area i(=1 to 256). The Evi value is calculated by calculating an average integrated value of G of the R, G, B signals in each divided area. The Evi value may also be calculated by generating a brightness signal from the R, G, B signals and calculating an average integrated value of this brightness signal.

The divided colorimetric calculation section 108 calculates an average integrated value for each color of the R, G, B signals for each divided area i(=1 to 256), obtains an integrated value of R, integrated value of B and integrated value of G and obtains a colorimetric value showing the ratio of integrated values (R/G, B/G) for each divided area. Therefore, 256 colorimetric values are calculated from the 1-screen image data.

The weighting divided photometric calculation section 110 multiplies the Evi value input to each divided area i from the divided photometric calculation section 106 by a weighting factor wi determined for the weighted area to which the divided area i belongs and outputs the multiplication result (wi×Evi) to the exposure value calculation section 114. The weighting factor wi is read from the weighted area determining section 102 based on the position information I(x,y) of the divided area i.

Furthermore, the weighting divided colorimetric calculation section 112 gives the weighting factor wi determined for the weighted area to which the divided area i belongs to a calorimetric value input for each divided area i from the divided colorimetric calculation section 108, and outputs the colorimetric value having the weighting factor wi to the white balance correction value calculation section 116.

The exposure value calculation section 114 calculates a weighted average based on the 256 weighted brightness values (wi×Evi) input from the weighting divided photometric calculation section 110 as shown in the following formula:

$Ev=(\Sigma wi \times Evi)/\Sigma wi$

The weighted average value Ev calculated in this way is output to the CPU 12 as an exposure value. The CPU 12 determines the aperture and shutter speed based on the exposure value input from the AE/AWB detection circuit 64, controls the electronic shutter and iris 44 of the CCD 38 and obtains the appropriate amount of exposure.

The white balance correction value calculation section 116 decides the type of light source based on a distribution or the like of colorimetric values having the weighting factor wi input from the weighting divided colorimetric calculation section 112 in the color space of R/G, B/G and calculates a white balance correction value suitable for the decided type of light source.

Figure 4:
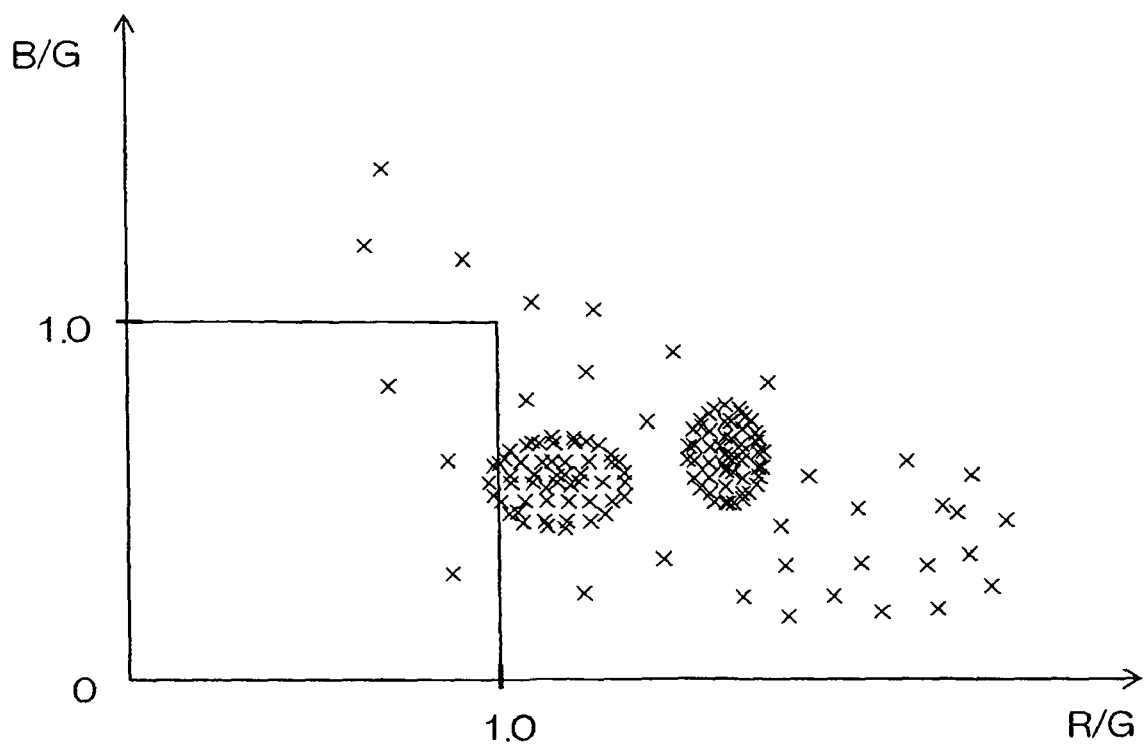
FIG. 4 is a graph showing an example of distribution of colorimetric values of each divided area in R/G, B/G color space.

FIG. 4 is a graph showing an example of distribution in the color space of R/G, B/G of calorimetric values of 256 divided areas. The white balance correction value calculation section 116 calculates the position of the center of gravity in the color space of R/G, B/G of colorimetric values of the 256 divided areas, decides under which type of light source out of various types of light source such as shade, blue sky, fluorescent lamp and tungsten lamp the image is taken from the position of the center of gravity and calculates a white balance correction value suitable for the decided type of light source. This white balance correction value is output to the white balance correction circuit in the image signal processing circuit 58, where gain correction (white balance correction) on the R, G, B signals is performed.

Note that since a weighting factor wi is added to each calorimetric value as described above, a calorimetric value having a large weighting factor contributes more to the calculation of the position of the center of gravity than a colorimetric value having a small weighting factor when the position of the center of gravity of each calorimetric value is calculated.

Furthermore, although this embodiment assumes that the type of light source is decided from the position of the center of gravity of each calorimetric value having a weighting factor, it is also possible to use the position of the center of gravity to calculate a white balance correction value instead of deciding the type of light source. For example, the gain values (white balance correction values) corresponding to the R, G, B signals of the white balance adjustment circuit are calculated so that the position of the center of gravity of each calorimetric value becomes the gray position (1,1) of the color space of R/G, B/G or the position at which the position of the center of gravity of each colorimetric value and gray position (1,1) are internally divided at a predetermined ratio. In the latter case, it is possible to perform white balance correction with an appropriate color tone remaining.

First Embodiment

Figure 5:
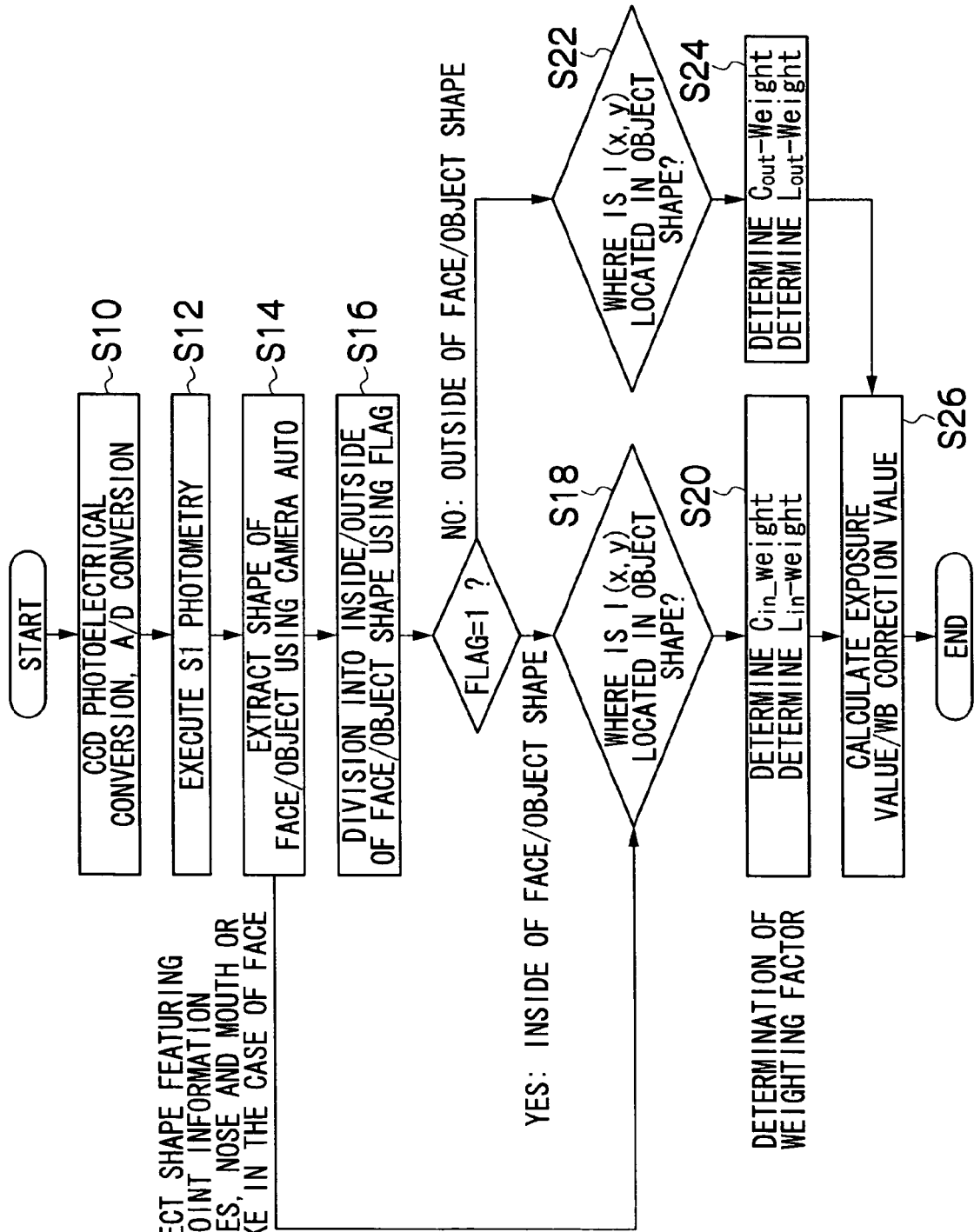
FIG. 5 is a flow chart showing a first embodiment of the image processing method according to the present invention.

A first embodiment of the image processing method according to the present invention will be explained with reference to the flow chart shown in FIG. 5.

A signal output from the CCD 38 is sent to the analog processing section (CDS/AMP) 52, where R, G, B signals for each pixel are sampled and held (correlative double sampling processing), amplified, and then added to the A/D converter 54. The dot sequential R, G, B signals converted to digital signals by the A/D converter 54 are acquired via the image input controller 56 (step S10).

Here, when the image taking button 24 is half depressed and S1 is turned ON, the camera 10 starts AF, AE and AWB (auto white balance) processing (step S12).

The principal object extraction section 100 of the AE/AWB detection circuit 64 extracts the shape of the principal object from the image data captured when S1 is turned ON and divides the principal object into the internal and external areas (step S14, S16).

In the case of the inside (flag=1) of the principal object, it is decided to which weighted area inside the principal object the position information I(x,y) of the divided area i subjected to divided photometry/divided colorimetry belongs (step S18), and the divided photometric weighting factor ($L_{in}$-weight) corresponding to the photometric value of the divided area i and the divided colorimetric weighting factor ($C_{in}$-weight) corresponding to the colorimetric value are determined (step S20).

Furthermore, in the case of the outside (flag=0) of the principal object, it is decided to which weighted area outside the principal object the position information I(x,y) of the divided area i subjected to divided photometry/divided colorimetry belongs (step S22), and the divided photometric weighting factor ($L_{out}$-weight) corresponding to the photometric value of the divided area i and the divided calorimetric weighting factor ($C_{out}$-weight) corresponding to the calorimetric value are determined (step S24). Note that in the first embodiment, the same value is used for the divided photometric weighting factor and the divided colorimetric weighting factor in the same weighted area.

The exposure value and white balance correction value are calculated based on the weighting factor determined as described above and photometric value and colorimetric value of each divided area (step S26).

Second Embodiment

Next, a second embodiment of the image processing method according to the present invention will be explained.

Figure 6:
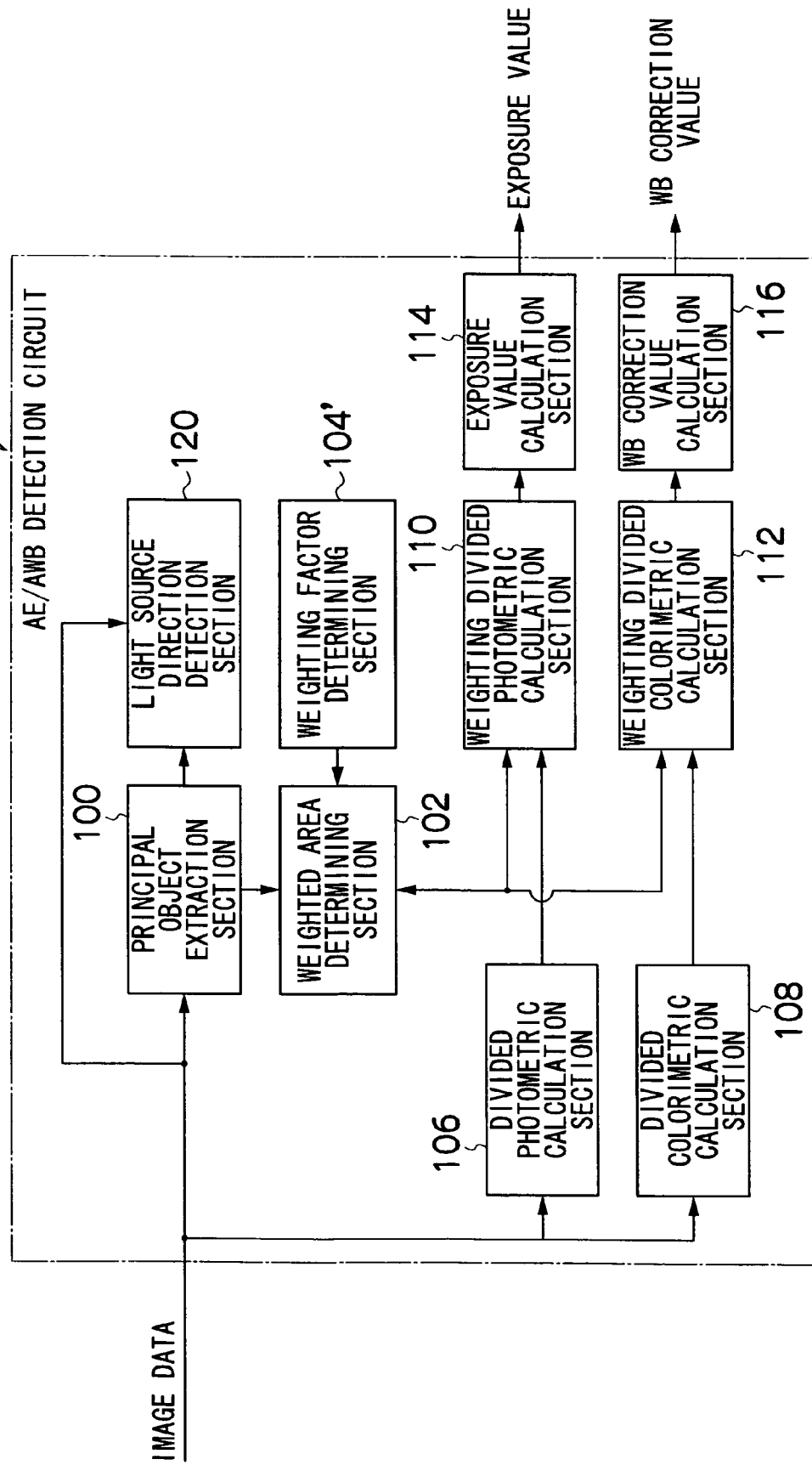
FIG. 6 is a block diagram showing a second embodiment of the AE/AWB detection circuit shown in FIG. 1.

FIG. 6 is a block diagram showing the second embodiment of the AE/AWB detection circuit. An AE/AWB detection circuit 64' shown in FIG. 6 is different from the AE/AWB detection circuit 64 shown in FIG. 2 in that it includes a light source direction detection section 120.

The light source direction detection section 120 inputs information on the shape of a principal object from a principal object extraction section 100 and also inputs image data and detects the incident direction of the light source corresponding to the principal object based on these inputs. That is, the light source direction detection section 120 detects the brightness of image data inside and image data outside the principal object based on information on the shape of the principal object and image data and decides, when the brightness inside the principal object is darker by a predetermined value or more than the brightness outside the principal object, that the light is backlight. On the other hand, when the light source direction detection section 120 decides that the light is not backlight, it further compares the brightness on the left and right sides inside the principal object and decides, and when there is a difference in the brightness equal to or greater than a predetermined value between the left and right sides, the light source direction detection section 120 decides that the light is oblique light. When the light is decided to be neither backlight nor oblique light, the light is decided to be front light.

The light source direction detection section 120 outputs information on the backlight, front light, or oblique light detected in this way to a weighting factor determining section 104'.

As described above, the weighting factor determining section 104' determines a weighting factor for each weighted area and further changes weighting factors based on information on backlight, front light or oblique light input from the light source direction detection section 120.

Now, suppose that a light source direction parameter is defined as Dir and backlight: Dir=a, front light: Dir=b, oblique light: Dir=c.

The weighting factor determining section 104' determines the following weighting factors for the internal area (flag=1) of the principal object using the above described light source direction parameter Dir.

$$I(x,y):V_{th1} \to L_{in}\text{-weight}=A1+\alpha i, C_{in}\text{-weight}=A1+\alpha i \quad (1)$$

$$I(x,y):V_{th2} \to L_{in}\text{-weight}=A2+\alpha i, C_{in}\text{-weight}=A2+\alpha i \quad (2)$$

$$I(x,y):V_{th3} \to L_{in}\text{-weight}=A3+\alpha i, C_{in}\text{-weight}=A3+\alpha i \quad (3)$$

where, $\alpha i$ (i=1 to 3): correction factor selected by light source direction parameter Dir[$\alpha 1$: backlight, $\alpha 2$: front light, $\alpha 3$: oblique light]. Furthermore, in the case of oblique light, different factors are used for the right and left sides.

Figure 7:
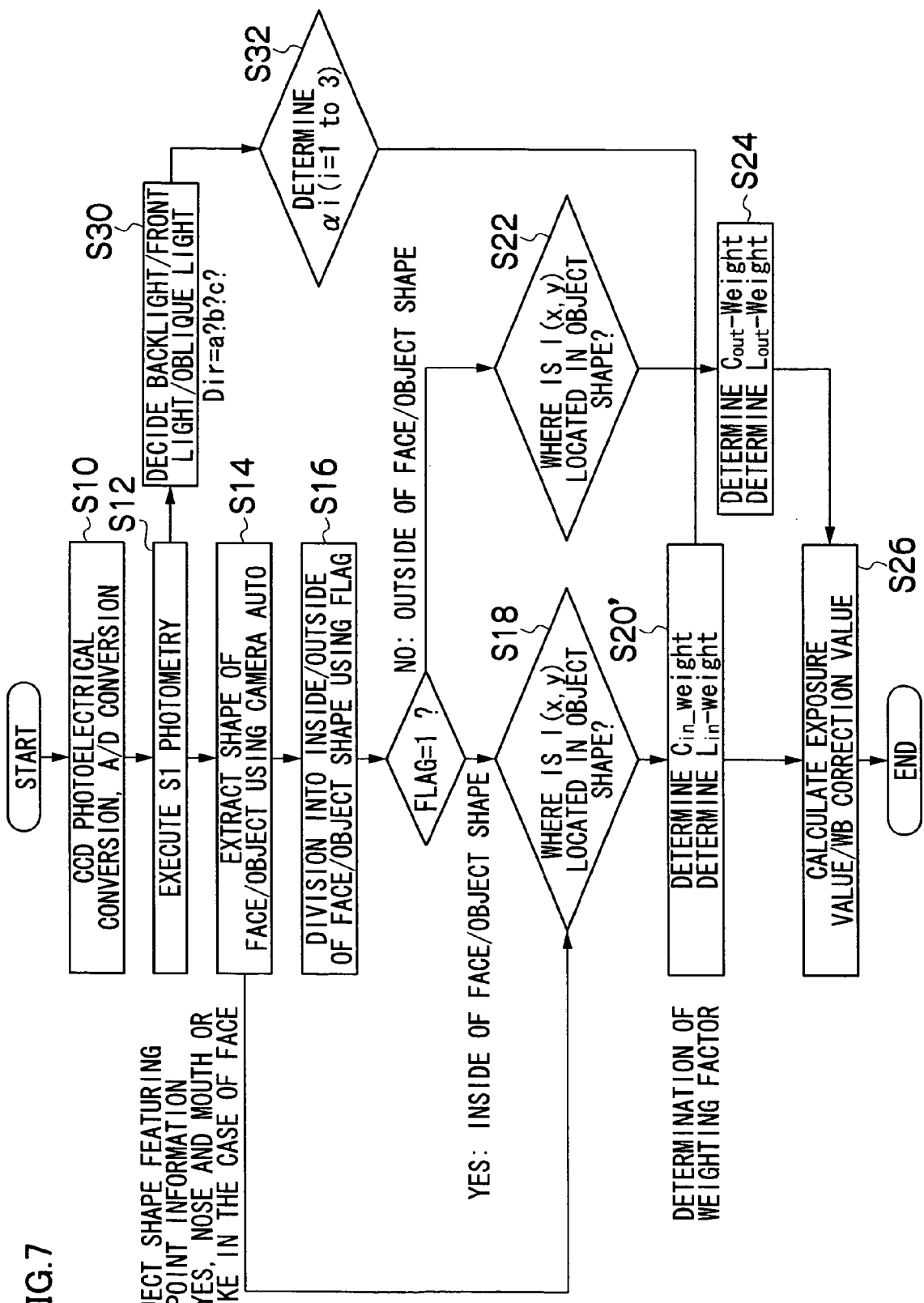
FIG. 7 is a flow chart showing a second embodiment of the image processing method according to the present invention.

FIG. 7 is a flow chart showing a second embodiment of the image processing method according to the present invention. Parts common to those of the first embodiment shown in FIG. 5 are assigned the same step numbers and detailed explanations thereof will be omitted.

In the flow chart shown in FIG. 7, processes in step S30 and S32 are added. In step S30, the direction of incident light upon the principal object (backlight, front light, oblique light) is decided. In step S32, correction factor αi is determined based on the decision result in step S30.

In step S20', the divided photometric weighting factor ($L_{in}$-weight) for the photometric value of the divided area i and the divided calorimetric weighting factor ($C_{in}$-weight) for the calorimetric value are determined depending on to which weighted area inside the principal object the position information I(x,y) of the divided area i belongs, and the correction factor determined in step S32 is added to the weighting factor.

For example, when the direction of the light incident upon the principal object is decided to be backlight direction and the principal object is a person's face, the inside of the person's face becomes dark and flesh coloring of the face deteriorates, and therefore a correction factor which further increases the weights of weighting factors in the area inside the face is added so as to allow more appropriate exposure correction.

Third Embodiment

Next, a third embodiment of the image processing method according to the present invention will be explained.

Figure 8:
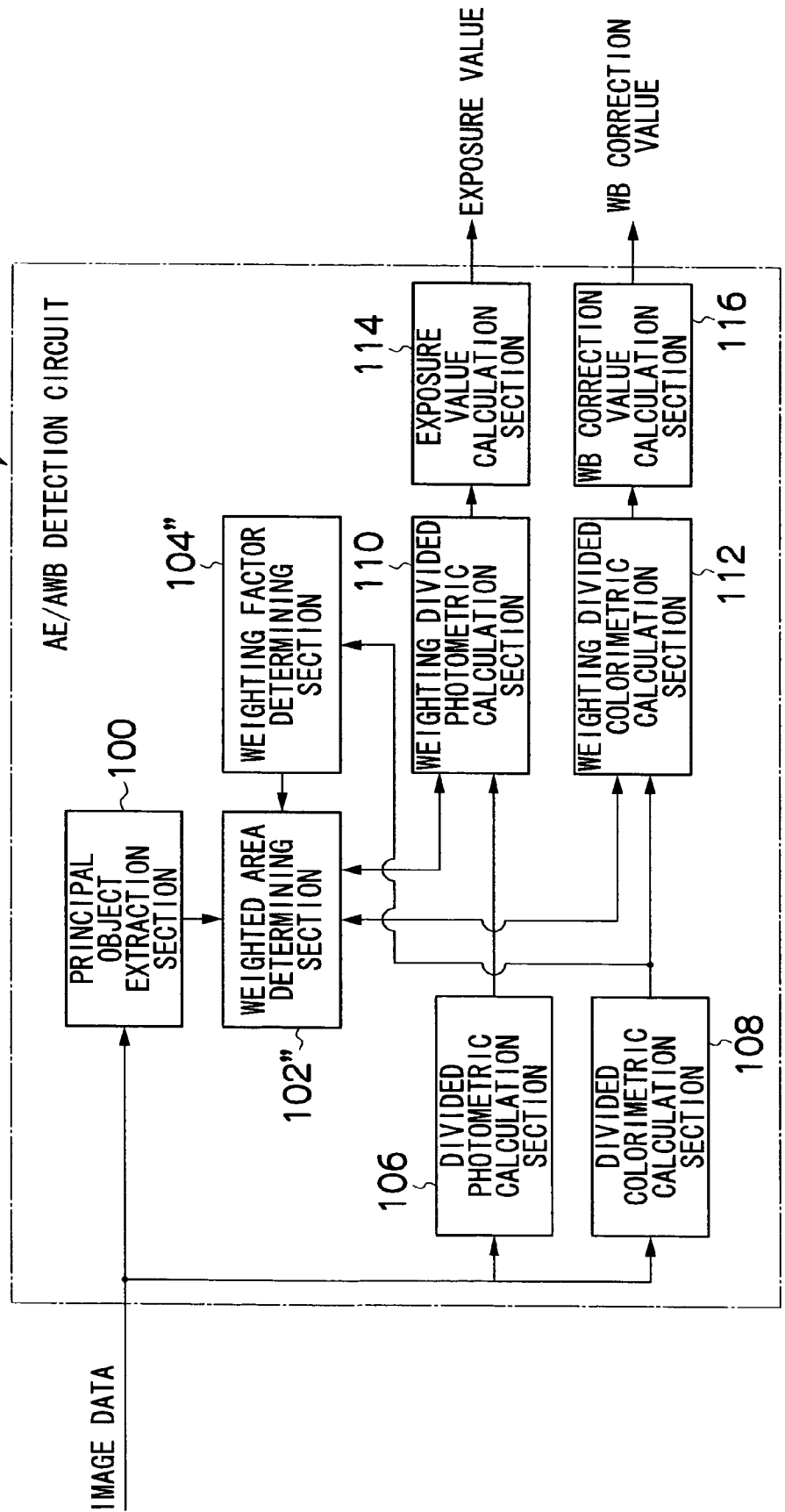
FIG. 8 is a block diagram showing a third embodiment of the AE/AWB detection circuit shown in FIG. 1.

FIG. 8 is a block diagram showing a third embodiment of the AE/AWB detection circuit. The AE/AWB detection circuit 64" shown in FIG. 8 is different from the AE/AWB detection circuit 64 shown in FIG. 2 in a weighted area determining section 102" and weighting factor determining section 104".

The weighting factor determining section 104" is designed to make variable a weighting factor corresponding to a photometric value output from the weighted area determining section 102" according to a divided calorimetric result input from a divided colorimetric calculation section 108.

That is, in the case of the inside (flag=1) of the principal object, the following weighting factors are determined for the area inside the principal object determined by the weighted area determining section 102" according to the divided colorimetric result of the inside of the principal object.

$$I(x,y):V_{th1} \to L_{in}\text{-weight}=A11, C_{in}\text{-weight}=A1 \qquad (1)$$

$$I(x,y):V_{th2} \to L_{in}\text{-weight}=A21, C_{in}\text{-weight}=A2 \qquad (2)$$

$$I(x,y):V_{th3} \to L_{in}\text{-weight}=A31, C_{in}\text{-weight}=A3 \qquad (3)$$

Likewise, in the case of the outside (flag=0) of the principal object, the following weighting factors are determined for areas having distances d1, d2, d3 from the center of the principal object according to the normal centerweighted metering divided photometric/divided colorimetric systems depending on the divided colorimetric result of the outside of the principal object.

A. Centerweighted Metering Divided Photometric/Divided Colorimetric System $$I(x,y):d1 \to L_{out}\text{-Weight}=B11, C_{in}\text{-weight}=B1 \qquad (1)$$

$$I(x,y):d2 \to L_{out}\text{-weight}=B21, C_{in}\text{-weight}=B2 \qquad (2)$$

$$I(x,y):d3 \to L_{out}\text{-weight}=B31, C_{in}\text{-weight}=B3 \qquad (3)$$

B. Average Divided Photometric/Divided Colorimetric System $$I(x,y):d1 \to L_{out}\text{-Weight}=C1, C_{in}\text{-weight}=C1 \qquad (1)$$

$$I(x,y):d2 \to L_{out}\text{-weight}=C12, C_{in}\text{-weight}=C1 \qquad (2)$$

$$I(x,y):d3 \to L_{out}\text{-weight}=C13, C_{in}\text{-weight}=C1 \qquad (3)$$

Figure 9:
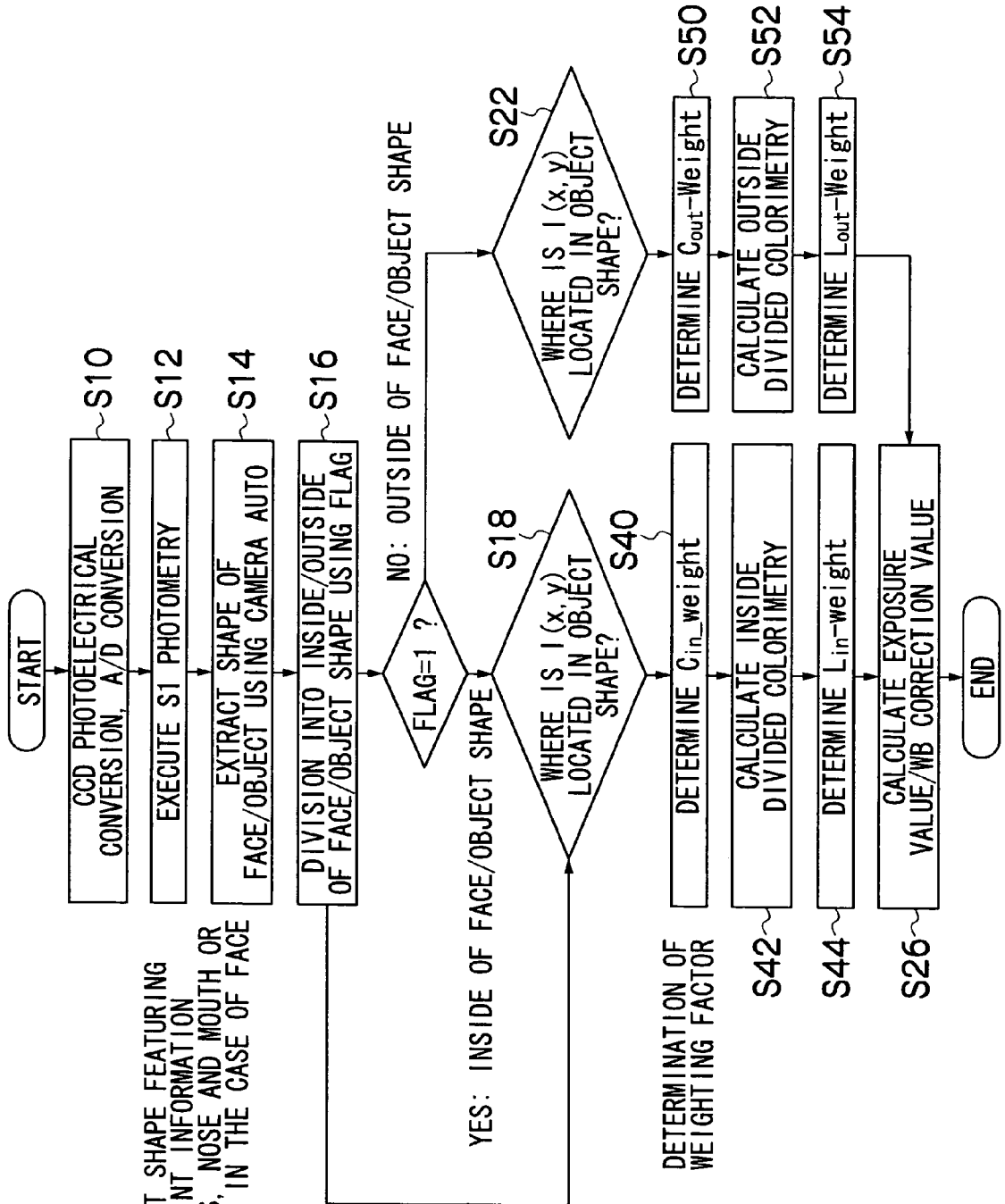
FIG. 9 is a flow chart showing a third embodiment of the image processing method according to the present invention.

FIG. 9 is a flow chart showing a third embodiment of the image processing method according to the present invention. Parts common to those of the first embodiment shown in FIG. 5 are assigned the same step numbers and detailed explanations thereof will be omitted.

In FIG. 9, the divided colorimetric weighting factor ($C_{in}$-weight) for the colorimetric value of the divided area i inside the principal object and the divided colorimetric weighting factor ($C_{out}$-weight) for the colorimetric value of the divided area i outside the principal object are determined as in the case of the first embodiment (step S40, S50).

On the other hand, the divided photometric weighting factor ($L_{in}$-weight) for the photometric value of the divided area i inside the principal object is changed according to the internal divided colorimetric calculation result in step S42 (step S44), and the divided photometric weighting factor ($L_{out}$-weight) for the photometric value of the divided area i outside the principal object is changed according to the external divided colorimetric calculation result in step S52 (step S54).

This makes it possible to improve exposure correction for the problem that it is not possible to recognize differences in colors or differences in spectral reflectance of an object, which is a defect of a conventional TTL (Through The Lens) photometric system. That is, it is possible to recognize what color the extracted object has before performing exposure correction which matches the object.

Figure 10A:
FIG. 10A shows an example of an original image including a flower.
Figure 10B:
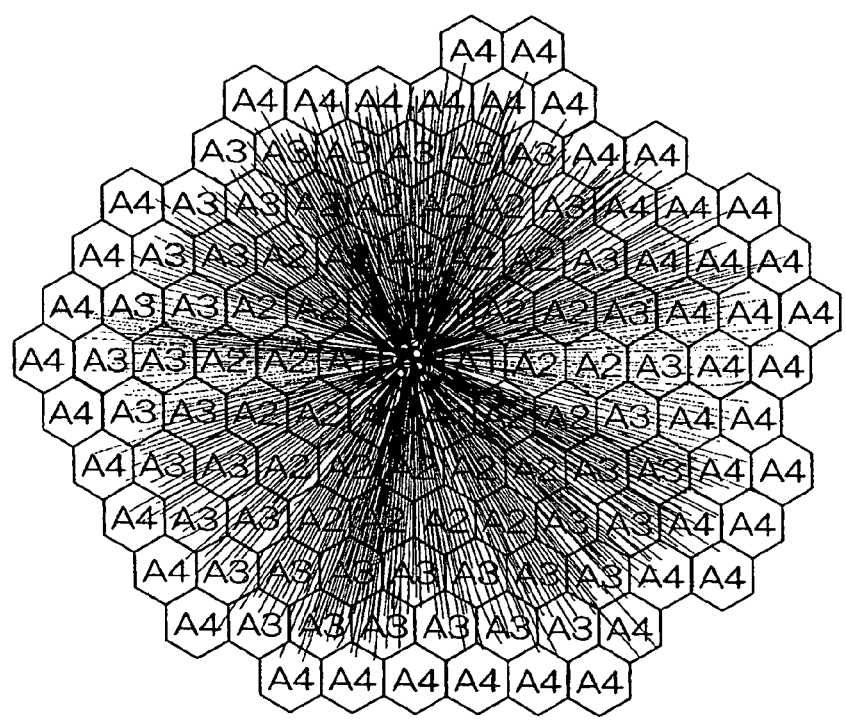
FIG. 10B shows a result of extraction of the shape of the principal object (flower) from the original image.

Although the third embodiment has been explained taking a person's face as an example of the principal object, the present invention is not limited to this and can be applied to exposure correction and white balance correction for various principal objects. FIG. 10A shows an original image using a flower as the principal object, and FIG. 10B shows extracting the shape of the flower from the original image and the respective weighted areas of the inside of the flower. As shown in FIG. 10B, the weighted area of the inside of the flower is divided according to the distance from the center of the flower and A1, A2, A3 designate weighting factors in the respective weighted areas.

What is claimed is:

1. An image processing apparatus, comprising:
a principal object extraction device which extracts a shape of a principal object from an overall undivided screen of an inputted image;
a weighted area determining device which determines an area of the principal object that matches the shape of the extracted principal object as a primary weighted area, and an area other than the area of the principal object as a secondary weighted area, and further divides the primary weighted area into a plurality of first weighted areas and the secondary weighted area into a plurality of second weighted areas;
a weighting factor determining device which determines a different weighting factor at least for each first weighted area of the plurality of first weighted areas in the weighted area according to a position of each first weighted area in the principal object, respectively;
a measuring device which divides the overall undivided screen of the inputted image into a plurality of measurement areas and calculates measured value(s) of divided photometry and/or divided colorimetry for each measurement area of the plurality of measurement areas; and
a correction device which performs exposure correction and/or white balance correction with respect to a position in the image based on the measured value(s) calculated for the measurement area of the plurality of measurement areas corresponding to the position in the image and the weighting factor(s) determined for the one of the plurality of first and second weighted areas corresponding to the position in the image.

2. The image processing apparatus according to claim 1, wherein the principal object extraction device extracts a person's face.

3. The image processing apparatus according to claim 2, wherein shapes of the plurality of first and second weighted area and the plurality of measurement areas obtained by dividing the overall screen are hexagons having the same area.

4. The image processing apparatus according to claim 1, wherein
   the principal object extraction device extracts a person's face,
   the weighted area determining device divides the primary weighted area, which is the area of the principal object into the plurality of first weighted areas, such that each of the plurality of first weighted areas corresponds to either of a flesh color area of the extracted person's face, a hair area of the person's hair, or a peripheral area peripheral to the flesh color area or the hair area, respectively, and
   the weighting factor determining device determines a different weighting factor for each of the plurality of first weighted areas in the primary weighted area according to whether each first weighted areas corresponds to the flesh color area, hair area, or the peripheral area, respectively.

5. The image processing apparatus according to claim 4, wherein
   the weighted area determining device divides the secondary weighted area, which is the area other than the area of the principal object, into the plurality of second weighted areas according to a distance from a center of the principal object, and
   the weighting factor determining device determines a different weighting factor for each of the plurality of second weighted areas in the secondary weighted area according to the distance of each second weighted area from the center of the principle object, respectively.

6. The image processing apparatus according to claim 1, wherein
   the weighted area determining device divides the secondary weighted area, which is the area other than the area of the principal object, into the plurality of second weighted areas according to a distance from a center of the principal object, and
   the weighting factor determining device determines a different weighting factor for each of the plurality of second weighted areas in the secondary weighted area according to the distance of each second weighted area from the center of the principle object, respectively.

7. The image processing apparatus according to claim 1, further comprising:
   a light source direction detection device which detects a direction of incidence of a light source with respect to the principal object,
   wherein the weighting factor determining device changes the weighting factor for the area of the principal object according to the detected direction of incidence of the light source with respect to the principal object.

8. The image processing apparatus according to claim 7, wherein
   the light source direction detection device detects states of backlight, front light and oblique light, and
   the weighting factor determining device changes the weighting factor for the area of the principal object according to whether the direction of incidence of a light source with respect to the detected principal object is in the state of backlight, front light or oblique light.

9. The image processing apparatus according to claim 1, wherein the weighting factor determining device further differentiates a weighting factor to be determined for each of the determined weighted areas between divided photometry and divided colorimetry.

10. The image processing apparatus according to claim 1, wherein
    the weighted area determining device divides the primary weighted area, which is the area of the principal object into a plurality of first weighted areas according to a distance from a center of the principal object, and
    the weighting factor determining device determines a different weighting factor for each first weighted area of the plurality of first weighted areas in the primary weighted area, according to the distance of each first weighted area from the center of the principle object, respectively.

11. An image processing method, comprising:
    extracting a shape of a principal object from an overall undivided screen of an image inputted from an imaging device;
    determining the area of the principal object that matches the shape of the extracted principal object as a primary weighted area, and an area other than the area of the principal object as a secondary weighted area, and further dividing the primary weighted area into a plurality of first weighted areas and the secondary weighted area into a plurality of second weighted areas;
    determining a weighting factor for each of the determined weighted areas, by determining a different weighting factor for at least each of the plurality of first weighted areas in the primary weighted area according a position of each first weighted area in the principal object, respectively;
    dividing the overall undivided screen of the inputted image into a plurality of measurement areas by a photometry and/or colorimetry device, and calculating the measured value(s) of photometry and/or colorimetry for each of the plurality of measurement areas; and
    carrying out exposure correction and/or white balance correction for a position in the image based on the measured value(s) calculated for the measurement area of the plurality of measurement areas corresponding to the position in the image and the weighting factor(s) determined for one of the first and second weighted areas corresponding to the position in the image.

* * * * *